United States Patent Office 3,209,045
Patented Sept. 28, 1965

3,209,045
PREPARATION OF ALKYL ARYL
HYDROCARBONS
George C. Feighner and Laurence D. Lindemuth, Ponca City, Okla., assignors to Continental Oil Company, Ponca City, Okla., a corporation of Delaware
No Drawing. Filed July 20, 1959, Ser. No. 828,052
4 Claims. (Cl. 260—671)

This invention relates to an improved process for the preparation of alkyl aryl hydrocarbons involving the alkylation of an aromatic hydrocarbon with an olefin whereby the desired alkyl aryl hydrocarbon is obtained in high yields.

Heretofore in alkylation processes an olefin is generally reacted with an excess of an aromatic hydrocarbon in the presence of an alkylation catalyst under alkylating conditions to form the desired alkyl aryl hydrocarbon. In addition to the desired product certain by-products are formed causing a loss in yield. These by products comprise aliphatic hydrocarbons, and a variety of alkyl aryl hydrocarbons the alkyl groups of which contain fewer carbon atoms than desired.

While we do not wish to be bound by a theory as to the exact nature of the reaction between the olefin and the aromatic hydrocarbon and particularly that involving the side reactions we believe that the reaction can be explained, using benzene and dodecene as the specific reactants, substantially as follows:

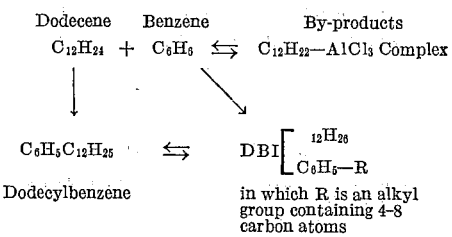

Dodecylbenzene — in which R is an alkyl group containing 4-8 carbon atoms

For brevity we prefer to identify the by-products listed above broadly as dodecylbenzene intermediate or DBI.

It is, therefore, a principal object of this invention to provide a process for the production of alkyl aryl hydrocarbons which process obviates the disadvantages of the prior art processes. It is another object of our invention to provide a process whereby the yield of the undesired by-products can be held to a minimum. Other objects and advantages of the present invention will be apparent from the following description:

Broadly stated, the present invention comprises a process whereby high yields of the alkyl aryl hydrocarbons can be produced by a reaction which comprises reacting an olefin with an aromatic hydrocarbon in the presence of an alkylation catalyst under alkylating conditions, separation of the sludge that forms and then subjecting the alkylated product and by-products to fractional distillation. After separating the desired alkyl aryl hydrocarbons and the by-products by fractional distillation the by-products are recycled to the alkylation step.

In order to disclose the nature of the present invention still more clearly the individual steps as given above will be described in detail and illustrated by specific examples. In the examples all parts are by weight.

I. RAW MATERIALS

A. Olefin hydrocarbon

Olefin hydrocarbons that may be used in the process of this invention are polymers of low molecular weight olefins such as pure propylene or mixtures of propylene and ethylene with other volatile hydrocarbons such as are present in cracked gases. A preferred olefin is a propene polymer such as dodecene or pentadecene.

B. Aromatic hydrocarbon

The aromatic hydrocarbon may be benzene or toluene; however, other aromatic hydrocarbons may be used if desired.

C. Catalyst

Suitable catalyst are those known as Friedel-Crafts type such as:

Group II halides: Zinc chloride.
Group III halides: Boron fluoride, boron chloride, boron bromide, aluminum chloride, aluminum bromide, aluminum iodide, gallium chloride, scandium chloride.
Group IV halides: Titanium tetrachloride, titanium tetrabromide, stannic chloride, stannic bromide.
Group V halides: Antimony trichloride, antimony pentachloride, antimony tribromide, bismuth trichloride.
Miscellaneous: Ferric chloride, hydrogen fluoride, sulfuric acid.

We generally prefer to use aluminum chloride.

D. Sludge separation

Following the reaction between the aromatic hydrocarbon and the olefin in the presence of the alkylation catalyst, the resulting mixture is allowed to settle for approximately 30 minutes after which period the catalyst sludge is drawn off. If desired, an additional quantity of the catalyst may be added, the resulting mixture agitated and again allowed to settle after which the catalyst sludge is drawn off. The sludge has some residual catalytic activity and may be recycled if desired.

E. Acid treating and neutralization

Following sludge separation the product remaining may be extracted with sulfuric acid to remove color and odor precursors present in the crude alkylated product. Both the concentration and the quantity of sulfuric acid used may be varied. Suitable and preferred quantities of the acid may vary from about 1 to 10 weight percent or more and 1 to 4 weight percent respectively, based upon the amount of crude alkylated product present. Suitable and preferred concentrations of the sulfuric acid may vary from 80 to 100 percent and 90 to 95 percent respectively. The temperature employed in the extraction step is not critical; for convenience a temperature of about 70° F. is preferred.

Any sulfuric acid contained in the alkylated aromatic hydrocarbon layer following extraction with sulfuric acid is neutralized by washing with an aqueous solution of a base such as sodium hydroxide or potassium hydroxide. A preferred concentration of the base is about 5 percent, however, concentrations above or below this value may be used. As to the amount of the alkali solution used for washing that may vary from about 1 to 10 weight percent, based upon the amount of crude alkylated product present.

F. Fractionation

Since the condensation is effected in the presence of an excess of the aromatic compound, the resulting product after sludge removal will contain a considerable quantity of the unreacted aromatic hydrocarbon. In addition it will contain as mentioned above aliphatic hydrocarbons, low molecular weight monoaryl alkanes and some high boiling bottoms products. After the unreacted aromatic hydrocarbon is removed by distillation at atmospheric pressure, the desired product may be recovered from the other components in the mixture by fractional distillation under reduced pressure. The temperature at which the different components are removed by distillation is dependent upon the identity of the component and upon the pressure at which the distillation is conducted. After the unreacted aromatic hydrocarbon is removed by distillation at atmospheric pressure, the pressure is reduced to generally about 20 mm. of mercury and the distillation continued. At this pressure the low molecular weight monoaryl alkanes and certain other components such as aliphatic hydrocarbons will be removed below about 100° C. The desired alkyl substituted aromatic hydrocarbon will be obtained over a temperature range of about 100 to 230° C.

We have found that if the benzene to be alkylated is mixed with the intermediate product and then the resulting mixture alkylated the yield of the desired product can be substantially increased with corresponding decrease in the yield of the undesired by-products. We have found further that, for example, when benzene is alkylated using dodecene as the specific olefin and by recycling the DBI the yield of either dodecylbenzene or postdodecylbenzene can be improved greatly depending upon the amount of DBI recycled. For example, as the ratio of DBI recycled to dodecene used increases from 0.2 to 0.5 the yield improvement is primarily in the dodecylbenzene fraction with a maximum at a ratio of about 0.4. By the dodecylbenzene fraction we mean that fraction which has initial and final boiling points of about 535° F. and 603° F. respectively as determined by A.S.T.M., D-158 Engler type distillation. If, however, the ratio of DBI recycled to dodecene increases beyond 0.5 the yield improvement is primarily in the postdodecylbenzene fraction. The postdodecylbenzene fraction has a boiling range of about 647° F. to 779° F. as determined by the same method.

still more clearly, the following illustrative examples will be given. It is to be understood that the invention is not to be limited to the specific conditions or details set forth in these examples, except so far as such limitations are specified in the appended claims.

EXAMPLE 1.—ALKYLATION OF BENZENE

To a reaction vessel equipped with a mechanical stirrer and thermometer was added a mixture comprising benzene and DBI. The dodecene, the aluminum chloride in an amount corresponding to 5% based upon the weight of dodecene and water 4% based upon the weight of the $AlCl_3$ were added over a period of 16 minutes. A mole ratio of benzene to olefin of 7.5 to 1 was used. The reaction temperature varied from 40 to 45 degrees C. Following the reaction the crude product was poststirred for 30 minutes and the sludge separated by gravity settling. The crude reaction product was washed with concentrated sulfuric acid and then with aqueous sodium hydroxide after which the excess benzene was removed by distillation at atmospheric pressure. Following the removal of the benzene the product was subjected to fractional distillation to separate the DBI from the desired alkyl benzene and post alkyl benzene fractions. In Table I below are summarized the results when various amounts of DBI were recycled to the alkylation step.

TABLE I.—DODECYLBENZENE DISTILLATION YIELD DATA AT 20 mm. HG

[Int. Recycled/Olefin]

|  | 0 | .20 | .257 | .351 | .428 | .497 | .715 | .993 |
|---|---|---|---|---|---|---|---|---|
| Net DBI/$C_{12}^=$ Weight Ratio | .267 | .157 | .124 | .082 | .076 | .074 | .026 | −.078 |
| DB/$C_{12}^=$ Weight Ratio | .972 | 1.003 | .992 | 1.074 | 1.074 | 1.057 | 1.008 | .895 |
| PDB/$C_{12}^=$ Weight Ratio | .211 | .169 | .175 | .159 | .133 | .170 | .223 | .408 |
| Net DBI/Benzene Weight Ratio | .468 | .222 | .200 | .154 | .126 | .092 | .047 | −.24 |
| DB/Benzene Weight Ratio | 1.71 | 1.42 | 1.60 | 2.06 | 1.78 | 1.30 | 1.84 | 2.45 |
| PDB/Benzene Weight Ratio | .371 | .239 | 2.82 | .304 | .219 | .211 | .407 | 1.12 |

DB=dodecylbenzene.
PDB=postdodecylbenzene.
DBI=dodecylbenzene intermediate.

EXAMPLE 2

The procedure of Example 1 was followed with the exception that pentadecene was substituted for dodecene and the amount of aluminum chloride was equal to 8% of the pentadecene used. In Table 2 below are summarized the results when various amounts of pentadecylbenzene intermediate were recycled to the alkylation step.

TABLE II.—PENTADECYLBENZENE DISTILLATION YIELD DATA AT 20 mm. HG

[Int. Recycled/Olefin]

|  | 0 | .38 | .64 | .66 | .83 | 1.16 | 1.36 |
|---|---|---|---|---|---|---|---|
| Net PBI/$C_{15}^=$ Weight Ratio | .578 | .433 | .365 | .370 | .358 | .202 | .157 |
| PB/$C_{15}^=$ Weight Ratio | .617 | .764 | .710 | .672 | .742 | .807 | .801 |
| Net PBI/Benzene Weight Ratio | .993 | .707 | .660 | .652 | .689 | .426 | .554 |
| PB/Benzene Weight Ratio | 1.06 | 1.13 | 1.28 | 1.19 | 1.42 | 1.69 | 2.82 |

PB=Pentadecylbenzene.
PBI=Pentadecylbenzene intermediate.

Dodecylbenzene and postdodecylbenzene are available commercially and are described in more detail in U.S. Patents 2,808,372 and 2,807,590 respectively.

It should be understood that the foregoing is given by way of explanation only. We have found that the yields of other alkyl aryl hydrocarbons can be increased when other olefins are used and the intermediate products recycled according to the procedure described above.

As to the amount of the intermediate recycled to the alkylation step that can be varied greatly depending as outlined above on the specific product desired. We have found that good results can be obtained wherein the ratio of intermediate recycled to olefin varies from about 0.2 to 1.5. The ratios given above are on a weight basis. Preferably all of the intermediate formed is recycled so that the net production of intermediate is zero.

In order to disclose the nature of the present invention

While particular embodiments of the invention have been described, it will be understood, of course, that the invention is not limited thereto since many modifications may be made, and it is, therefore, contemplated to cover by the appended claims any such modifications as fall within the true scope and spirit of the invention. We have not described in detail sulfonation procedures or sludge removal as such procedures are well known to those skilled in the art.

The invention having thus been described, what is claimed and desired to be secured by Letters Patent is:

1. In a process for the production of alkyl aryl hydrocarbon in which an olefinic polymer of a low molecular weight olefin is reacted with an aromatic hydrocarbon in the presence of an alklylation catalyst under alkylating conditions to form a mixture comprising alkyl aryl hydrocarbons, spent catalyst and reaction products having a lower and a higher molecular weight than said alkyl aryl hydrocarbons, in which catalyst sludge is separated from reaction product, in which said reaction product is subjected to fractional distillation to separate said alkyl aryl hydrocarbons from said lower and higher molecular weight reaction products, the improvement which comprises recycling low molecular weight reaction products to the alkylation reaction and varying the amount of recycle of said low molecular weight reaction products to said olefinic polymer in the range of ratios by weight of about 0.5 to about 1.5 whereby greater amounts of the higher molecular weight products are produced.

2. The process of claim 1 wherein the alkylation catalyst is aluminum chloride.

3. The process of claim 2 wherein the olefin is dodecene and the aromatic hydrocarbon is benzene.

4. The process of claim 2 wherein the olefin is pentadecene and the aromatic hydrocarbon is benzene.

References Cited by the Examiner

UNITED STATES PATENTS

| 2,322,482 | 6/43 | Stahly et al. | 260—683.59 |
| 2,518,529 | 8/50 | De Casson et al. | 260—271 |
| 2,851,503 | 9/58 | Shiffler | 260—671 |

FOREIGN PATENTS

| 663,068 | 12/51 | Great Britain. |

OTHER REFERENCES

Hougen et al., Chemical Process Principles, Part Two, "Thermodynamics," Wiley & Sons, New York (1947), pp. 718–720.

ALPHONSO D. SULLIVAN, *Primary Examiner.*

ALLAN M. BOETTCHER, DANIEL E. WYMAN,
*Examiners.*